(12) United States Patent
Nagaya et al.

(10) Patent No.: US 6,198,264 B1
(45) Date of Patent: Mar. 6, 2001

(54) MAXIMUM DUTY RATIO SETTING CIRCUIT FOR A DC-DC CONVERTER

(75) Inventors: Yoshihiro Nagaya; Takashi Matsumoto, both of Kasugai (JP)

(73) Assignee: Fijitsu Limited, Kawasaki (JP)

( * ) Notice: Subject to any disclaimer, the term of this patent is extended or adjusted under 35 U.S.C. 154(b) by 0 days.

(21) Appl. No.: 09/487,889

(22) Filed: Jan. 19, 2000

(30) Foreign Application Priority Data

Jan. 21, 1999 (JP) .................................................. 11-012779

(51) Int. Cl.⁷ ........................................................ G05F 1/40

(52) U.S. Cl. ............................................ 323/284; 323/222

(58) Field of Search ..................................... 323/222, 282, 323/284, 234, 288, 351

(56) References Cited

U.S. PATENT DOCUMENTS

| | | | | |
|---|---|---|---|---|
| 4,087,850 | * | 5/1978 | Koizumi | 363/21 |
| 6,025,706 | * | 2/2000 | Takimoto et al. | 323/282 |
| 6,078,170 | * | 6/2000 | Sudo | 323/282 |

FOREIGN PATENT DOCUMENTS 3-76313    4/1991  (JP) .

* cited by examiner

Primary Examiner—Peter S. Wong
Assistant Examiner—Gary L. Laxton
(74) Attorney, Agent, or Firm—Armstrong, Westerman, Hattori, McLeland & Naughton

(57) ABSTRACT

A duty ratio setting circuit includes a triangular waveform oscillation circuit for generating a triangular waveform signal and an error amplifying circuit that compares a detection voltage with a reference voltage and generates a control voltage based on the difference between the compared voltages. A comparator is connected to the oscillation circuit and the amplifying circuit and compares the voltage of the triangular waveform signal with the control voltage, and generates a first rectangular waveform signal having a predetermined duty ratio based on the comparison. A pulse signal generator generates a pulse signal having a predetermined pulse width and which is synchronized with the triangular waveform signal. A logic circuit connected to the comparator and the pulse signal generator receives the first rectangular waveform signal and the pulse signal and generates a second rectangular waveform signal. The second rectangular waveform signal has a maximum duty ratio based on the pulse width of the pulse signal when the duty ration of the first rectangular waveform signal exceeds the maximum duty ratio.

17 Claims, 7 Drawing Sheets

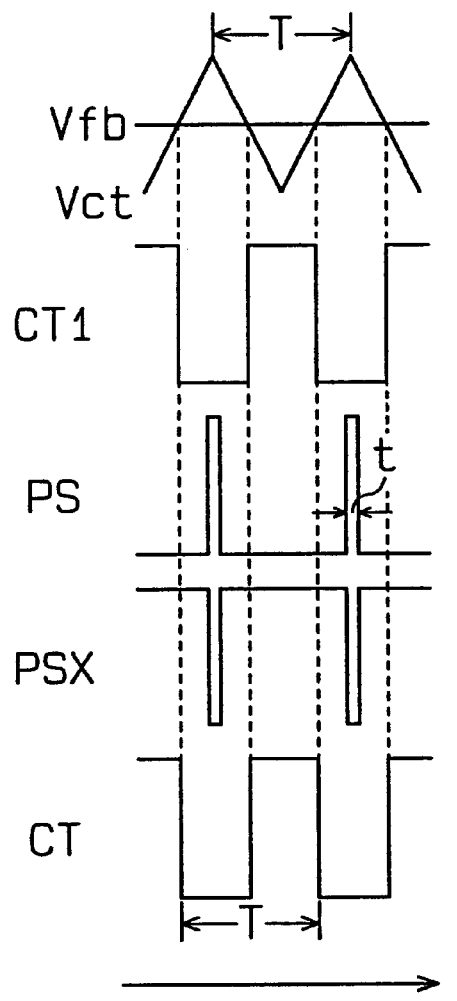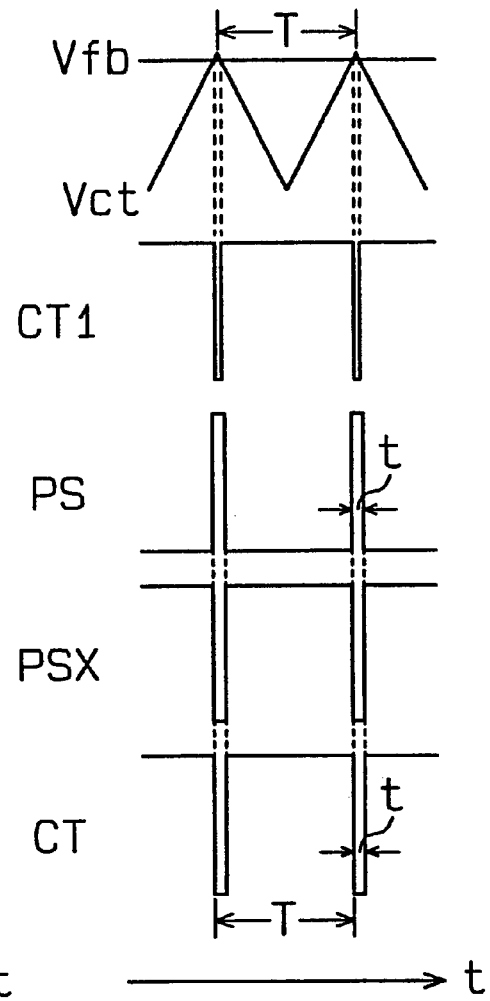

MAXIMUM DUTY RATIO SETTING CIRCUIT FOR A DC-DC CONVERTER

BACKGROUND OF THE INVENTION

The present invention relates to a DC-DC converter, and more particularly, to duty control of an output transistor for a DC-DC converter.

FIG. 1 is a circuit diagram showing a conventional step up type DC-DC converter 50 configured in accordance with a pulse width modulation (PWM) system. The DC-DC converter 50 includes a DC-DC converter circuit 51, which generates an output voltage Vout by pulling up a DC input voltage Vin. The DC-DC converter circuit 51 includes an output transistor M1, which is preferably an NMOS transistor, a reactor L1, a diode D1, and a capacitor C1. The DC input voltage Vin is applied to the drain of the output transistor M1 via the reactor L1. The source of the output transistor M1 is connected to the ground. The anode of the diode D1 is connected to the drain of the output transistor M1. The cathode of the diode D1 is connected to an output terminal Po of the DC-DC converter 50. The capacitor C1 is connected between the output terminal Po and the ground.

The output transistor M1 is controlled to go ON and OFF so that the output voltage Vout output from the output terminal Po is higher than the input voltage Vin. The output voltage Vout is controlled by adjusting the ratio between the ON time Ton and the OFF time Toff of the output transistor M1.

The output voltage Vout relative to the input voltage Vin is expressed by the equation of:

$$Vout = \{(Ton + Toff)/Toff\}Vin$$
$$= Vin/Doff.$$

In the equation, Doff represents the OFF duty ratio and is the inverse of (Ton+Toff)/Toff, or Toff/(Ton+Toff).

When the condition of Doff+Don=1 (Don is the ON duty ratio) is satisfied, the output voltage Vout is expressed by the equation of:

$$Vout = Vin/Doff$$
$$= Vin/(1-Don).$$

The DC-DC converter 50 further includes an output voltage detection circuit 52 and a control circuit 53. The output voltage detection circuit 52 has detection resistors R1, R2. The detection resistors R1, R2 are connected in series between the output terminal Po and the ground. The detection resistors R1, R2 divide the output voltage Vout to provide a divisional voltage (detection voltage) VF to the control circuit 53.

The control circuit 53 has an error amplifying circuit 54, a reference voltage setting circuit 55, a triangular waveform oscillation circuit 56, a dead time circuit 57, a PWM comparator 58, and an output buffer 59.

The error amplifying circuit 54 compares the detection voltage VF with a predetermined reference voltage Vref output from the reference voltage setting circuit 55. The resulting differential voltage is amplified to form an error output voltage Vfb and provided to the PWM comparator 58 (refer to FIGS. 2(a) and 2(b)).

The triangular waveform oscillation circuit 56 provides a triangular waveform signal Vct, which oscillates within a predetermined voltage range, to the PWM comparator 58. The dead time circuit 57 provides a maximum duty setting voltage Vk2 to the PWM comparator 58. The maximum duty setting voltage Vk2 is the voltage that determines the maximum ON duty ratio of the output transistor M1.

The PWM comparator 58 compares the smaller one of the error output voltage Vfb and the maximum duty setting voltage Vk2 with the triangular waveform signal Vct. Under normal conditions, the PWM comparator 58 compares the error output voltage Vfb with the triangular waveform signal Vct since the error output voltage Vfb is smaller than the maximum duty setting voltage Vk2. Referring to FIG. 2(a), the PWM comparator 58 generates a high output signal CT when the triangular waveform signal Vct is less than the error output voltage Vfb and generates a low output signal CT when the triangular waveform signal Vct is greater than the error output voltage Vfb.

The ON duty ratio Don (Ton/(Ton+Toff)) increases as the error output voltage Vfb increases (i.e., as the output voltage Vout becomes lower than the predetermined set voltage). In other words, the period during which the output signal CT is high (ON time Ton) becomes longer than the period of which the output signal CT is low (OFF time Toff). On the other hand, the ON duty ratio Don (Ton/(Ton+Toff)) decreases as the error output voltage Vfb decreases (i.e., as the output voltage Vout becomes greater than the predetermined set voltage). In other words, the low period of the output signal CT (OFF time Toff) becomes longer than the high period of the output signal CT (ON time Ton).

If the error output voltage Vfb is greater than the maximum duty set voltage Vk2 as shown in FIG. 2(b), the PWM comparator 58 compares the maximum duty set voltage Vk2 and the triangular waveform signal Vct. The high period of the output signal CT (ON time Ton) is limited to a maximum time, which is less than 100% (e.g., 80%), when the error output voltage Vfb is greater than the maximum duty setting voltage Vk2. This is because the output transistor M1 remains activated when the OFF period is null. Under such condition, the DC-DC converter circuit 51 does not function. The maximum duty setting voltage Vk2 is thus set so that the OFF period Toff is not nullified. In other words, the maximum ON duty ratio Don (maximum ON duty ratio Dmax) is determined by the maximum duty setting voltage Vk2.

The output signal CT of the PWM comparator CT is applied to the gate of the output transistor M1 via the output buffer 59. The output transistor M1 is activated by a high output signal CT and deactivated by a low output signal CT.

A larger maximum ON duty ratio Dmax is preferable since the set voltage range of the output voltage Vout and the operational range of the DC-DC converter can be widened. Accordingly, it is preferred that the maximum duty setting voltage Vk2 be as close as possible to the maximum value of the triangular waveform signal Vct.

However, fluctuations in the triangular waveform signal Vct or the effects of an input offset voltage of the PWM comparator 58 may cause the maximum duty setting voltage Vk2 to be greater than the maximum voltage of the triangular waveform signal Vct. The maximum ON duty ratio Dmax is thus set at a relatively small value taking the fluctuations and input offset voltage into consideration. Accordingly, a relatively large maximum ON duty ratio Dmax cannot be obtained and the output voltage Vout cannot be increased. Further, if the maximum ON duty ratio Dmax is small, the same output voltage Vout cannot be obtained even if the input voltage Vin is decreased. Therefore, the output voltage Vout cannot be obtained from the DC-DC converter by using a battery.

SUMMARY OF THE INVENTION

It is an object of the present invention to provide a DC-DC converter having an increased maximum duty ratio.

To achieve the above object, the present invention provides a method for generating a rectangular waveform signal having a maximum duty ratio. The method includes the steps of generating a first rectangular waveform signal having a predetermined duty ratio and generating a second rectangular waveform signal having a maximum duty ratio by logically synthesizing the first rectangular waveform signal with a pulse signal having a predetermined pulse width.

In another aspect of the present invention, a duty ratio setting circuit is provided. The duty ratio setting circuit includes a comparator for comparing an oscillation signal and a control voltage and generating a first rectangular waveform signal having a predetermined duty ratio. A pulse signal generating circuit is connected to the comparator to generate a pulse signal having a predetermined pulse width. A logic circuit is connected to the comparator and the pulse signal generating circuit to receive the first rectangular waveform signal and the pulse signal and generate a second rectangular waveform signal having a maximum duty ratio based on the pulse width of the pulse signal when the duty ratio of the first rectangular waveform signal exceeds the maximum duty ratio.

In a further aspect of the present invention, a duty ratio setting circuit is provided. The duty ratio setting circuit includes a triangular waveform oscillation circuit for generating a triangular waveform signal. An error amplifying circuit compares a detection voltage and a reference voltage to generate a control voltage based on the difference therebetween. A comparator is connected to the triangular waveform oscillation circuit and the error amplifying circuit to compare the voltage of the triangular waveform signal with the control voltage and generate a first rectangular waveform signal having a predetermined duty ratio. A pulse signal generating circuit generates a pulse signal having a predetermined pulse width and synchronized with the triangular waveform signal. A logic circuit is connected to the comparator and the pulse signal generating circuit to receive the first rectangular waveform signal and the pulse signal and generate a second rectangular waveform signal having a maximum duty ratio based on the pulse width of the pulse signal when the duty ratio of the first rectangular waveform signal exceeds the maximum duty ratio.

In a further aspect of the present invention, a DC-DC converter is provided. The DC-DC converter includes a switching element duty controlled to convert an input voltage to an output voltage. An output voltage detection circuit detects the output voltage and generates a detection voltage. A control circuit duty controls the switching element based on the detection voltage. The control circuit includes a triangular waveform oscillation circuit for generating a triangular waveform signal, an error amplifying circuit for comparing the detection voltage and a reference voltage to generate a control voltage based on the difference therebetween. A comparator is connected to the triangular waveform oscillation circuit and the error amplifying circuit to compare the voltage of the triangular waveform signal with the control voltage and generate a first rectangular waveform signal having a predetermined duty ratio. A pulse signal generating circuit generates a pulse signal having a predetermined pulse width and synchronized with the triangular waveform signal. A logic circuit is connected to the comparator and the pulse signal generating circuit to receive the first rectangular waveform signal and the pulse signal and generate a second rectangular waveform signal having a maximum duty ratio based on the pulse width of the pulse signal when the duty ratio of the first rectangular waveform signal exceeds the maximum duty ratio.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4(a) is diagram showing the output waveform of the DC-DC converter of FIG. 3 under normal conditions, and FIG. 4(b) is a diagram showing the output waveform of the DC-DC converter of FIG. 3 when the ON duty ratio is maximum;

DETAILED DESCRIPTION OF THE PREFERRED EMBODIMENTS

Figure 1:
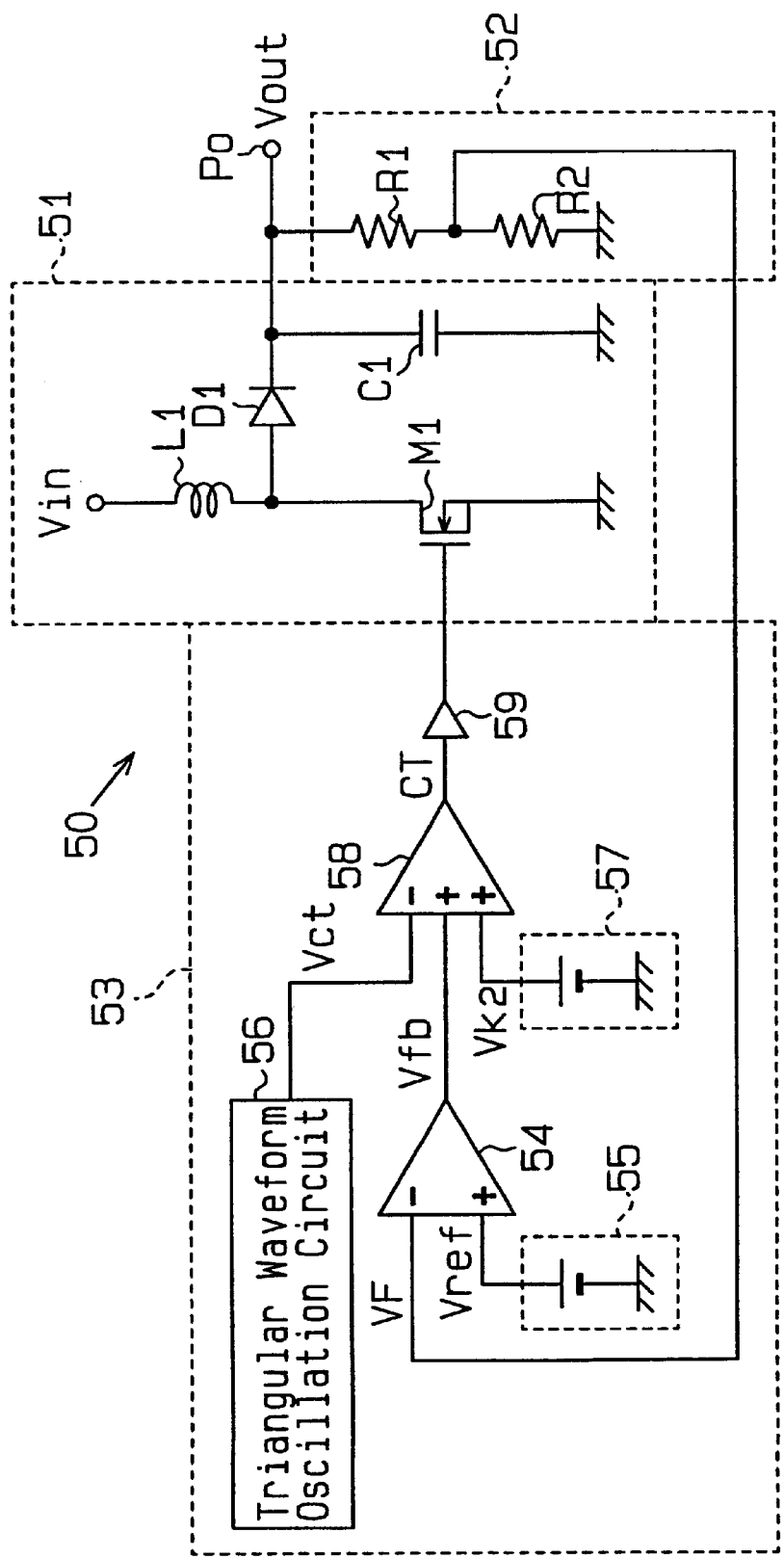
FIG. 1 is a circuit diagram showing a prior art DC-DC converter.
Figure 2A:
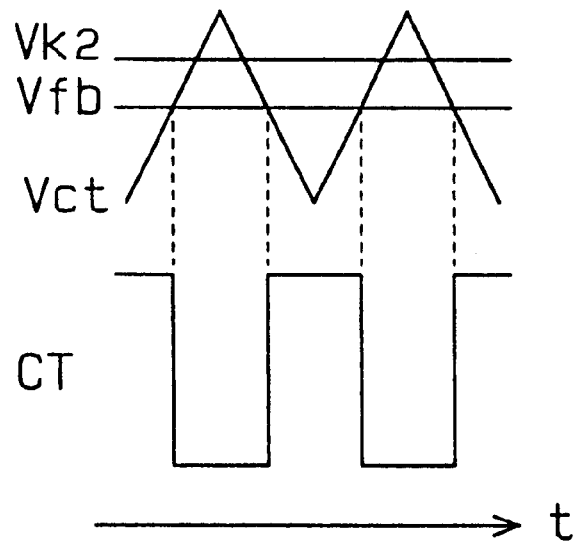
FIG. 2(a) is diagram showing the output waveform of the DC-DC converter of FIG. 1 under normal conditions.
Figure 2B:
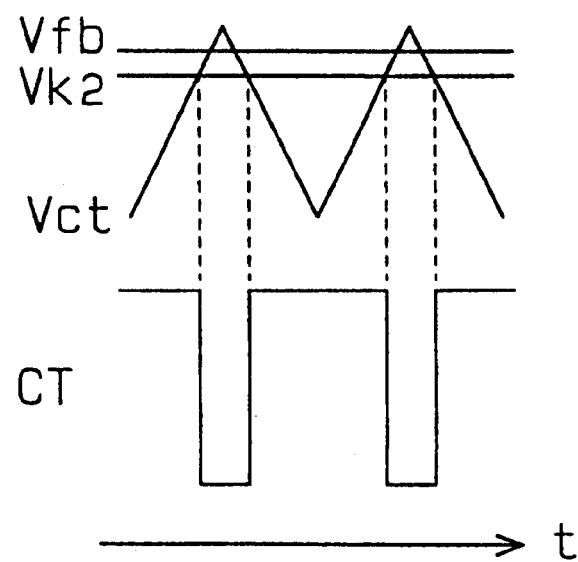
FIG. 2(b) is a diagram showing the output waveform of the DC-DC converter of FIG. 1 when the ON duty ratio is maximized.

In the drawings, like numerals are used for like elements throughout.

Figure 3:
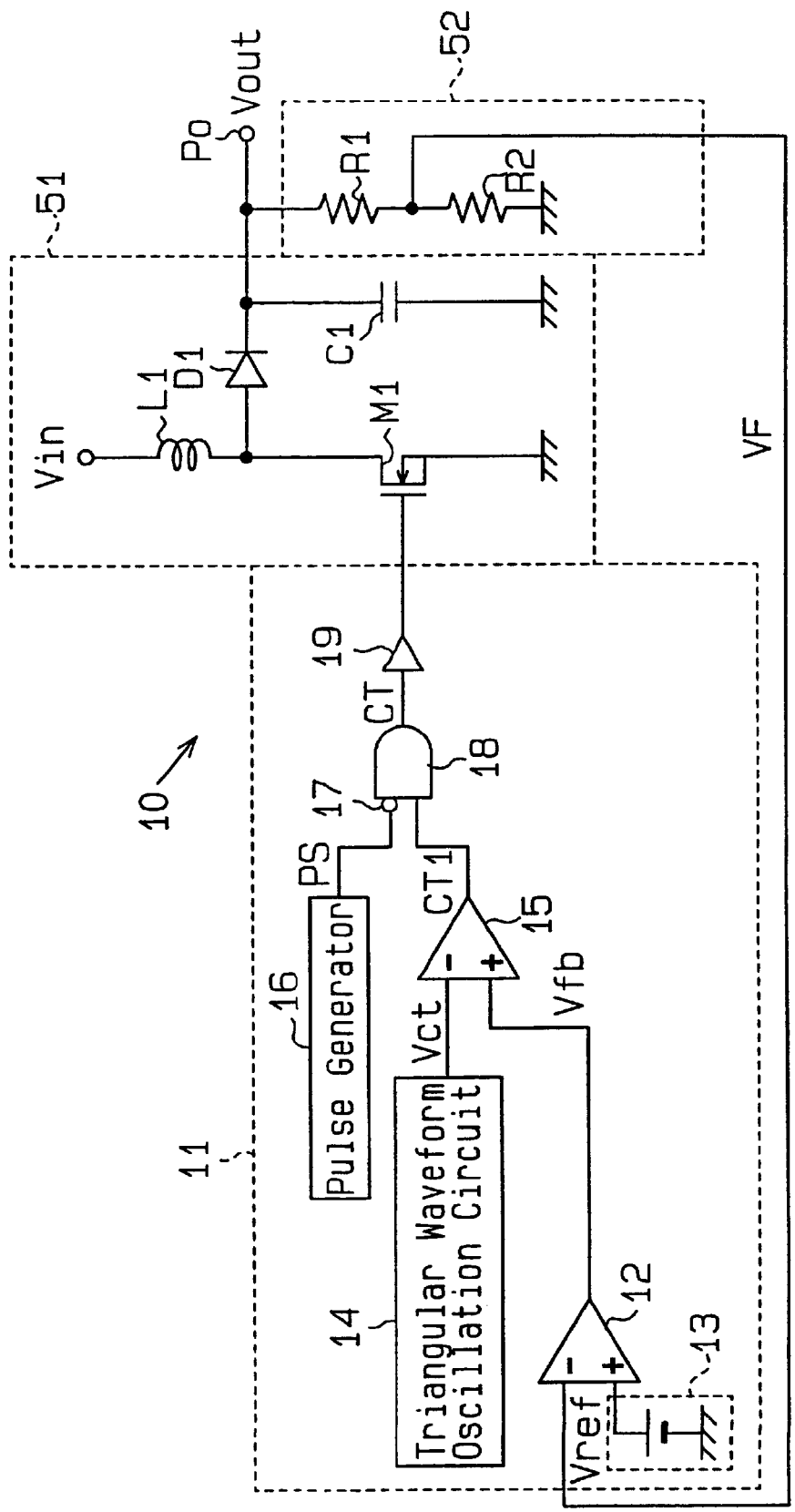
FIG. 3 is a circuit diagram showing a DC-DC converter according to a first embodiment of the present invention.

FIG. 3 is a circuit diagram showing a DC-DC converter 10 according to a first embodiment of the present invention. The DC-DC converter 10 includes a control circuit 11.

As shown in FIG. 3, the control circuit 11, which serves as a duty ratio setting circuit, has an error amplifying circuit 12, a reference voltage setting circuit 13, a triangular waveform oscillation circuit 14, a comparator 15, a pulse generator 16, an inverter circuit 17, an AND circuit 18, and an output buffer 19.

The error amplifying circuit 12 receives a voltage (detection voltage) VF, generated by the output voltage detection circuit 52, and a predetermined reference voltage Vref, generated by the reference voltage setting circuit 13. Then, the error amplifying circuit 12 compares the detection voltage VF and the reference voltage Vref, amplifies the differential voltage, and generates an error output voltage Vfb. The reference voltage Vref is substantially equal to the detection voltage VF, which is obtained by dividing the predetermined set voltage (output voltage Vout) of the output terminal Po.

When the detection voltage VF and the reference voltage Vref are substantially the same (when the output voltage Vout is equal to the predetermined set voltage), the error amplifying circuit 12 generates an error output voltage Vfb that is equal to a predetermined reference value. As the detection voltage VF exceeds the reference voltage Vref and the difference therebetween becomes greater, the error output voltage Vfb generated by the error amplifying circuit 12 becomes less than the reference value and the difference therebetween becomes greater. On the other hand, as the detection voltage VF becomes less than the reference voltage Vref and the difference therebetween becomes greater, the error output voltage Vfb generated by the error amplifying circuit 12 becomes greater than the reference value. In other words, the error output voltage Vfb generated by the error amplifying circuit 12 is inversely proportional to the detection voltage VF (output voltage Vout).

With reference to FIG. 4, the triangular waveform oscillation circuit 14 provides a triangular waveform signal Vct, which oscillates within a predetermined voltage range and has a predetermined cycle, to the comparator 15. When the detection voltage VF and the reference voltage Vref are substantially the same, the error output voltage Vfb (the predetermined reference value) generated by the error amplifying circuit 12 is equal to a voltage value corresponding to the substantially middle amplitude point of the triangular waveform signal Vct. In other words, if the output voltage Vout is equal to the predetermined set voltage, the error output voltage Vfb (the predetermined reference value) is equal to a voltage value corresponding to the substantially middle amplitude point of the triangular waveform signal Vct. The triangular waveform oscillation circuit 14 generates the triangular waveform signal Vct by repetitively charging and discharging a known charging-discharging circuit (not shown).

The comparator 15 receives the triangular waveform signal Vct from the triangular waveform oscillation circuit 14 and the error output voltage Vfb from the error amplifying circuit 12 and compares the triangular waveform signal Vct with the error output voltage Vfb. As shown in FIG. 4(*a*), the comparator 15 generates a high first output signal CT1 (rectangular waveform signal) when the triangular waveform signal Vct is smaller than the error output voltage Vfb and a low first output signal CT1 when the triangular waveform signal Vct is greater than the error output voltage Vfb.

As the error output voltage Vfb increases (i.e., as the output voltage Vout decreases), the period during which the first output signal CT1 is high (ON time Ton) becomes longer than the period during which the first output signal CT1 is low (OFF time Toff). That is, the ON duty ratio Don (Ton/(Ton+Toff)) increases.

On the other hand, as the error output voltage Vfb decreases (i.e., as the output voltage Vout increases), the low period of the first output signal CT1 (OFF time Toff) becomes longer than the high period (ON time Ton) of the first output signal CT1. That is, the ON duty ratio Don (Ton/(Ton+Toff)) decreases.

When the error output voltage Vfb corresponds to the substantially middle amplitude point of the triangular waveform signal Vct, the ON duty ratio Don (Ton/(Ton+Toff)) is about 0.5 (50%). That is, when the predetermined set voltage is output from the output terminal Po, the comparator 15 generates a first output signal CT1, the ON duty ratio DON of which is 0.5 (50%). As the output voltage Vout increases, the ON duty ratio Don of the first output signal CT1 generated by the comparator 15 becomes smaller. On the other hand, as the output voltage Vout decreases, the ON duty ratio Don of the first output signal CT1 generated by the comparator 15 becomes greater.

The pulse generator 16 generates a pulse signal PS having a predetermined width and predetermined cycle. The cycle of the pulse signal PS is substantially the same as the cycle T of the triangular waveform signal Vct. The pulse signal PS is generated every time the triangular waveform signal Vct reaches its maximum voltage value. More specifically, the pulse signal PS rises immediately before and falls immediately after the triangular waveform signal Vct reaches the maximum voltage value. Further, the pulse signal PS is generated so that the middle point of its pulse width t corresponds to the timing at which the triangular waveform signal Vct reaches the maximum voltage value.

The pulse width t of the pulse signal PS is set so that the formula of t/T(Ton/(Ton+Toff)) obtains a value of about 0.1. In this formula, t represents the pulse width, Ton represents the ON time, and T represents a cycle starting from when the pulse signal PS rises and ending when the pulse signal PS rises next. The pulse generator 16 generates a pulse signal PS, the ON duty ratio DON(Ton/(Ton+Toff)) of which is about 0.1.

With reference to FIGS. 4(*a*) and 4(*b*), the AND circuit 18 receives an invert signal PSX (the inverted signal of pulse signal PS) provided from the pulse generator 16 via the inverter circuit 17 and the first output signal CT1 from the comparator 15. The invert signal PSX has an ON duty ratio DON (Ton/(Ton+Toff)) of about 0.9. The pulse generator 16 and the inverter circuit 17 form a pulse generating circuit. The AND circuit 18 generates a high output signal CT (rectangular waveform signal) when the invert signal PSX and the first output signal CT1 are both high and a low output signal CT when at least one of the invert signal PSX and the first output signal CT1 is low.

If the ON duty ratio Don of the first output signal CT1 is smaller than 0.9, the AND circuit 18 outputs an output signal CT having the same phase as the first output signal CT1. As shown in FIG. 4(*a*), since the period during which the invert signal PSX is low (OFF time Toff) is shorter than the period during which the first output signal CT1 is low (OFF time Toff), the AND circuit 18 generates an output signal CT which ON duty ratio Don is the same as that of the first output signal CT1.

If the ON duty ratio Don of the first output signal CT1 is 0.9, the AND circuit 18 outputs an output signal CT having the same phase as the first output signal CT1 (invert signal PSX). In other words, since the first output signal CT1 and the invert signal PSX have the same pulse width t and are input to the AND circuit 18 at the same timing, the AND circuit 18 generates an output signal CT, which ON duty ratio Don is 0.9.

If the ON duty ratio Don of the first output signal CT1 exceeds 0.9, the AND circuit 18 outputs an output signal CT having the same phase as the invert signal PSX. With reference to FIG. 4(*b*), since the period during which the invert signal PSX is low (OFF time Toff) is longer than the period during which the first output signal CT1 is low (OFF time Toff), the AND circuit 18 generates an output signal CT which ON duty ratio Don is 0.9 and the same as that of the invert signal PSX. Accordingly, an output signal CT which ON duty ratio Don exceeds 0.9 is not generated and the ON duty ratio Don of 0.9 is the maximum ON duty ratio Dmax. The maximum ON duty ratio Dmax is determined based on the invert signal PSX (i.e., the pulse width t of the pulse signal PS provided by the pulse generator 16). In other words, the maximum ON duty ratio Dmax is determined by the pulse t of the pulse signal PS, which is not affected by other signals.

The output signal CT of the AND circuit 18 is applied to the gate of the output transistor M1 of the DC-DC converter circuit 51 via the output buffer 19. The output transistor M1 goes ON when the output signal CT is high and goes OFF when the output signal CT is low. By duty controlling the output transistor M1 with the output signal CT, the DC-DC converter circuit 51 pulls up the DC input voltage Vin and generates the output voltage Vout (predetermined set voltage).

The operation of the DC-DC converter 10 will now be described. When the output voltage Vout exceeds the predetermined set voltage, the detection voltage VF becomes greater than the reference voltage Vref. The error amplifying circuit 12 provides the error output voltage Vfb, which is smaller than the reference value (corresponding to the middle amplitude point of the triangular waveform signal Vct), to the comparator 15. The comparator 15 compares the error output voltage Vfb with the triangular waveform signal Vct and sends the first output signal CT1, the ON duty ratio Don of which is smaller than 0.5, to the AND circuit 18. Since the ON duty ratio of the first output signal CT1 is less than 0.9, the AND circuit 18 generates an output signal CT having the same ON duty ratio Don as the first output signal CT1. The activated time of the output transistor M1 is shortened by the output transistor M1, the ON duty ratio Don of which is less than 0.5. As a result, the output voltage Vout decreases to the predetermined set voltage. When the output voltage Vout reaches the predetermined set voltage, the AND circuit 18 generates an output signal CT having an ON duty ratio Don of 0.5.

When the output voltage Vout is lower than the predetermined set voltage, the detection voltage VF becomes smaller than the reference voltage Vref. The error amplifying circuit 12 provides the error output voltage Vfb, which is greater than the reference value, to the comparator 15. In this case, the error output voltage Vct is greater than a value corresponding to the middle amplitude point of the triangular waveform signal Vct. Thus, the comparator 15 provides a first output signal CT1, the ON duty ratio Don of which is greater than 0.5, to the AND circuit 18. Since the ON duty ratio Don of the first output signal CT1 is 0.9 or less, the AND circuit 18 generates an output signal CT having the same ON duty ratio Don as the first output signal CT1. The output signal CT, which duty ratio Don is greater than 0.5, prolongs the activated time of the output transistor M1. As a result, the output voltage Vout increases to the predetermined set voltage. As the output voltage Vout increases, the AND circuit 18 generates an output signal CT that causes the ON duty ratio Don to approach the value of 0.5. When the output voltage Vout reaches the predetermined set voltage, the AND circuit 18 generates an output signal CT having an ON duty ratio Don of 0.5.

When the ON duty ratio of the first output signal CT1 exceeds about 0.9, the AND circuit 18 generates an output signal CT having the same phase as the invert signal PSX (i.e., the ON duty ratio Don being 0.9). That is, the AND circuit 18 generates an output signal CT having an ON duty ratio Don of 0.9 even if the ON duty ratio Don of the first output signal CT1 exceeds 0.9. Accordingly, the output transistor M1 is duty controlled by the maximum ON duty ratio Dmax of about 0.9.

The characteristics of the DC-DC converter 10 will now be described.

(1) The maximum ON duty ratio Dmax of the output signal CT is set by the pulse width t of the pulse signal PS output from the pulse generator 16. Accordingly, the value of the maximum ON duty ratio Dmax is easily adjusted by changing the pulse width t of the pulse signal PS.

(2) Since the pulse signal PS is not affected by fluctuations in the level of other signals, the maximum ON duty ratio DMAX does not change. Accordingly, differences in the peak value of the triangular waveform signal Vct or the effects of the input offset voltage of the comparator do not change the maximum ON duty ratio Dmax.

(3) The maximum ON duty ratio Dmax need not be set taking into consideration the fluctuations of other signals. Further, the maximum ON duty ratio Dmax can be set at a maximum value of 0.9.

(4) Since the maximum ON duty ratio Dmax can be set at 0.9, the range of the output voltage Vout and the operational range of the DC-DC converter can be increased or widened. Accordingly, a large output voltage Vout can be generated with a relatively low input voltage Vin.

(5) The pulse signal PS rises immediately before and falls immediately after the voltage of the triangular waveform signal Vct reaches the maximum value. Further, the pulse signal PS rises so that the voltage of the triangular waveform signal Vct reaches the maximum value at a timing corresponding to the middle of the pulse width of the pulse signal PS. By providing the first output signal CT1 and the invert signal PSX of the pulse signal PS to the AND circuit, the generation of an output signal CT having a maximum ON duty ratio Dmax of 0.9 is guaranteed regardless of the ON duty ratio Don exceeding 0.9. Further, the output signal CT having the maximum ON duty ratio Dmax is generated by the AND circuit 18, the circuit configuration of which is very simple. Thus, the circuit area of the control circuit 11 need not be increased.

It should be apparent to those skilled in the art that the present invention may be embodied in many other specific forms without departing from the spirit or scope of the invention. Particularly, it should be understood that the present invention may be embodied in the following forms.

Figure 5:
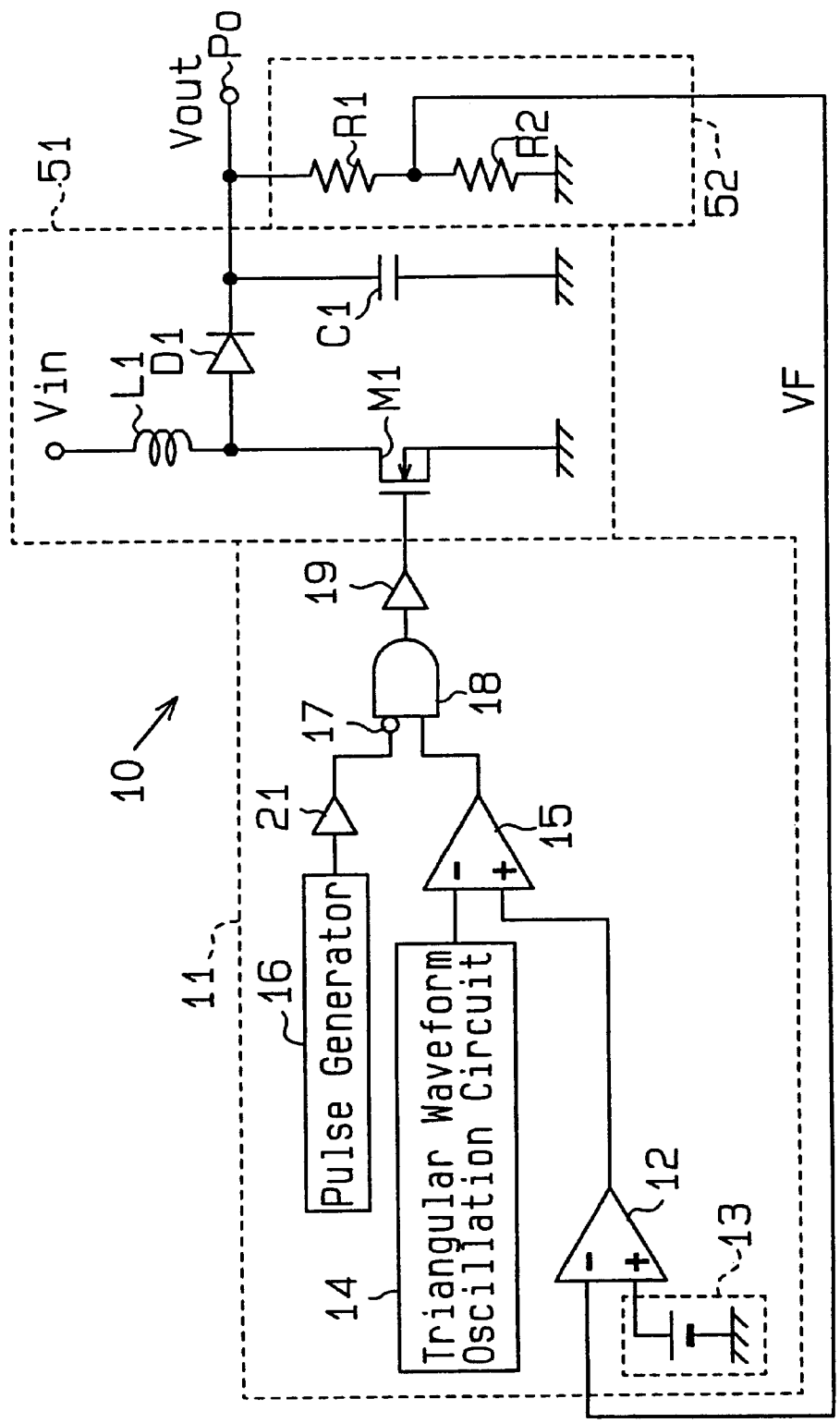
FIG. 5 is a circuit diagram showing a DC-DC converter according to a second embodiment of the present invention.

(a) As shown in FIG. 5, a delay circuit 21, which is preferably an output buffer, may be arranged between the pulse generator 16 and the inverter circuit 17. The delay circuit 21 adjusts the timing for providing the invert signal of the pulse signal PS to the AND circuit 18. In this case, the output signal CT having the maximum ON duty ratio Dmax can be generated more accurately without having to improve the accuracy of the pulse generator 16.

Figure 6:
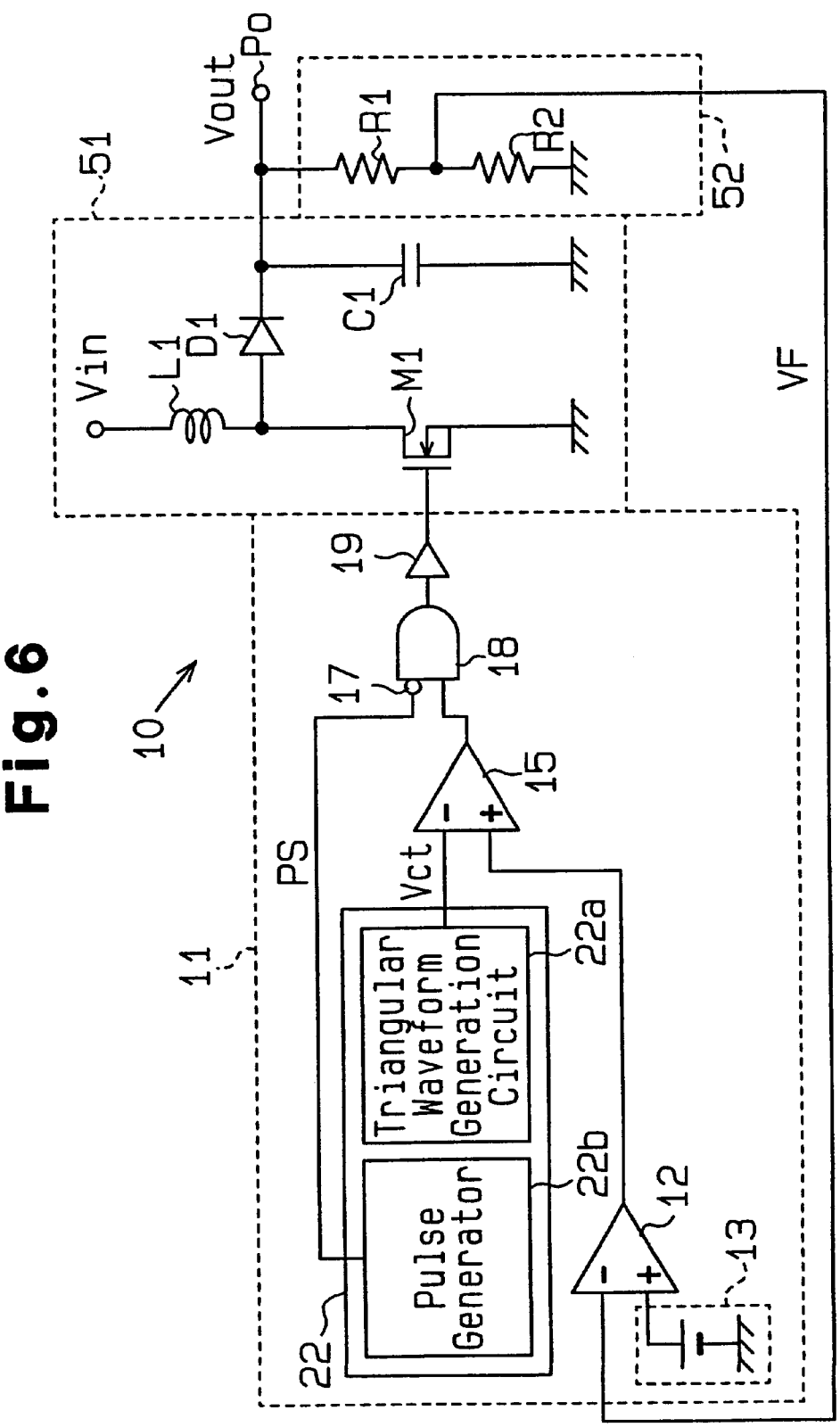
FIG. 6 is a circuit diagram showing a DC-DC converter according to a third embodiment of the present invention.

(b) As shown in FIG. 6, a triangular waveform oscillation circuit 22 for generating the pulse signal PS in addition to the triangular waveform signal Vct may be used. The triangular waveform oscillation circuit 22 includes a triangular waveform generating circuit 22a, which generates the triangular waveform signal Vct, and a pulse generating circuit 22b, which generates the pulse signal PS. Further, the triangular waveform generating circuit 22a has a known charging-discharging circuit (not shown) for generating the triangular waveform signal Vct by repetitive charging and discharging. The pulse generating circuit 22b generates a pulse signal PS in response to a changeover control signal (not shown) used when shifting the triangular waveform generating circuit from the charging operation to the discharging operation.

Figure 7:
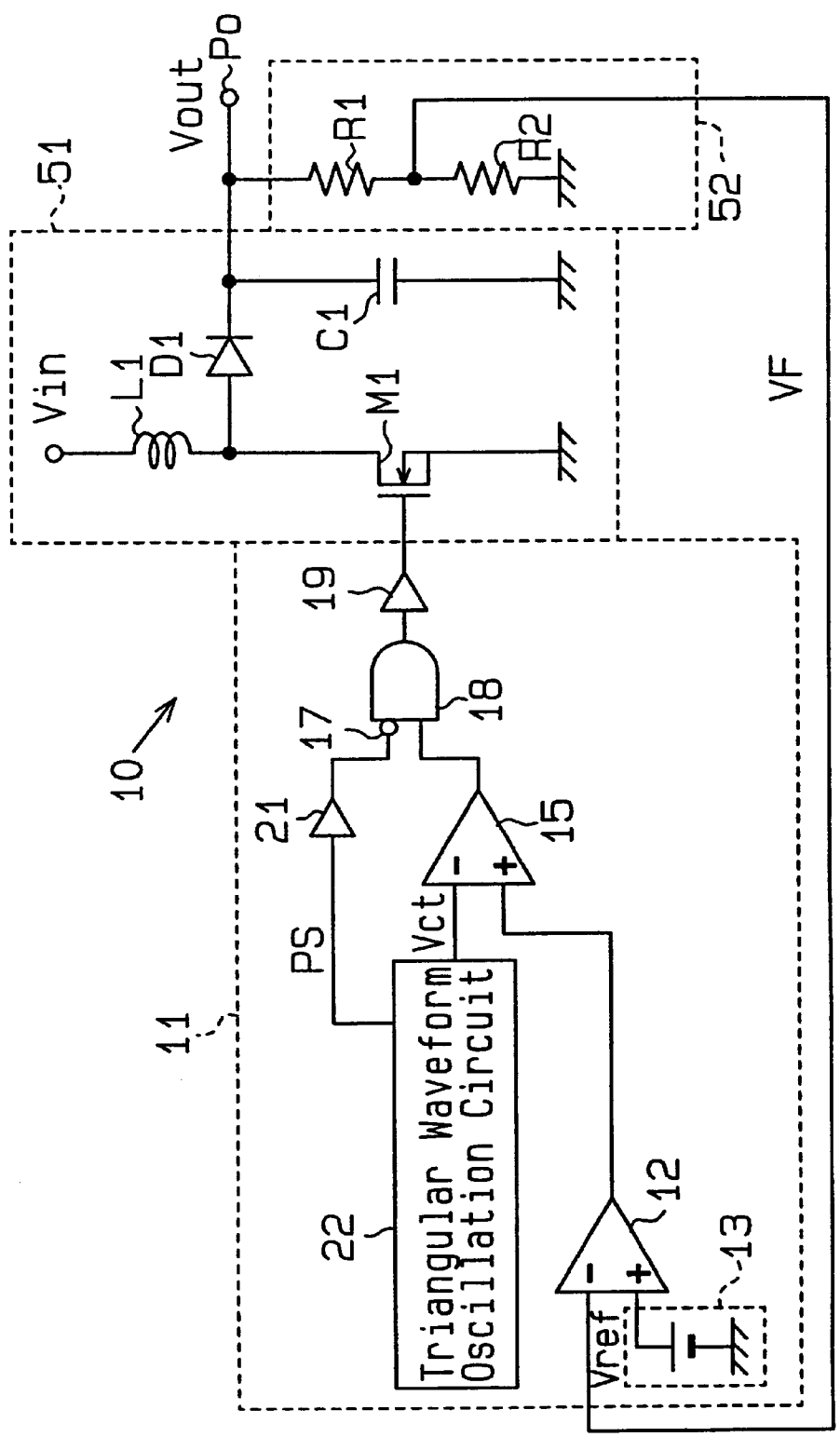
FIG. 7 is a circuit diagram showing a DC-DC converter according to a fourth embodiment of the present invention.

(c) As shown in FIG. 7, a delay circuit 21 formed by an output buffer may be arranged between the triangular oscillation circuit 22 of FIG. 6 and the inverter circuit 17. In this case, the output signal CT having the maximum ON duty ratio Dmax is generated more accurately without having to improve the accuracy of the pulse generating circuit of the triangular waveform oscillation circuit 22.

(d) Instead of the triangular waveform signal Vct, an oscillation signal having a constant amplitude and a constant cycle, such as a sawtooth waveform signal or a sine (cosine) waveform signal, may be used.

(e) The control circuit 11 according to the present invention may be employed in a pull-down type DC-DC converter. Further, the control circuit 11 according to the present invention may be employed in, for example, a drive control apparatus for driving a motor. The drive control apparatus duty controls a switching element to control the voltage applied to the motor.

(f) The control circuit 11 may set a maximum OFF duty ratio instead of the maximum ON duty ratio Dmax. In this case, an inverter circuit for generating the inverted signal of the output signal CT may be used in lieu of the output buffer 19 of FIGS. 3, 5, 6, and 7.

The present examples and embodiments are to be considered as illustrative and not restrictive, and the invention is not to be limited to the details given herein, but may be modified within the scope and equivalence of the appended claims.

What is claimed is:

1. A method for generating a rectangular waveform signal having a predetermined maximum duty ratio, the method comprising the steps of:

generating a first rectangular waveform signal having a first duty ratio by comparing a control voltage and a voltage of an oscillation circuit;

generating a pulse signal having a predetermined pulse width; and generating a second rectangular waveform signal having the predetermined maximum duty ratio by logically synthesizing the first rectangular waveform signal with the pulse signal.

2. The method according to claim 1, wherein the second rectangular waveform generating step includes generating the second rectangular waveform signal based on the pulse width of the pulse signal when the first duty ratio of the first rectangular waveform signal exceeds the predetermined maximum duty ratio.

3. The method according to claim 2, wherein the maximum duty ratio corresponds to a maximum ON duty ratio.

4. The method according to claim 3, wherein the maximum ON duty ratio is about 0.9.

5. A duty ratio setting circuit comprising:

a comparator for comparing an oscillation signal and a control voltage and generating a first rectangular waveform signal having a first duty ratio;

a pulse signal generating circuit that generates a pulse signal having a predetermined pulse width; and a logic circuit connected to the comparator and the pulse signal generating circuit to receive the first rectangular waveform signal and the pulse signal and generate a second rectangular waveform signal having a predetermined maximum duty ratio based on the pulse width of the pulse signal when the first duty ratio of the first rectangular waveform signal exceeds the predetermined maximum duty ratio.

6. The duty ratio setting circuit according to claim 5, wherein the pulse signal generating circuit includes a timing adjustment circuit for synchronizing the timing of providing the pulse signal to the logic circuit with the timing of providing the first rectangular waveform signal to the logic circuit.

7. The duty ratio setting circuit according to claim 5, wherein the pulse signal generating circuit includes:

an oscillation circuit for generating an oscillation signal by repetitive charging and discharging in accordance with a changeover control signal; and a pulse generating circuit for generating the pulse signal in response to the changeover control signal.

8. The duty ratio setting circuit according to claim 5, wherein the maximum duty ratio corresponds to a maximum ON duty ratio.

9. The duty ratio setting circuit according to claim 8, wherein the maximum ON duty ratio is about 0.9.

10. The duty ratio setting circuit according to claim 5, wherein the logic circuit is an AND circuit.

11. A duty ratio setting circuit comprising:

a triangular waveform oscillation circuit for generating a triangular waveform signal;

an error amplifying circuit for comparing a detection voltage and a reference voltage to generate a control voltage based on a difference therebetween;

a comparator connected to the triangular waveform oscillation circuit and the error amplifying circuit to compare the voltage of the triangular waveform signal with the control voltage and generate a first rectangular waveform signal having a first duty ratio;

a pulse signal generating circuit for generating a pulse signal having a predetermined pulse width and synchronized with the triangular waveform signal; and a logic circuit connected to the comparator and the pulse signal generating circuit to receive the first rectangular waveform signal and the pulse signal and generate a second rectangular waveform signal having a predetermined maximum duty ratio based on the pulse width of the pulse signal when the first duty ratio of the first rectangular waveform signal exceeds the predetermined maximum duty ratio.

12. The duty ratio setting circuit according to claim 11, wherein the pulse signal generating circuit includes a timing adjustment circuit for synchronizing the timing of providing the pulse signal to the logic circuit with the timing of providing the first rectangular waveform signal to the logic circuit.

13. The duty ratio setting circuit according to claim 11, wherein the pulse signal generating circuit includes:

an oscillation circuit for generating an oscillation signal by repetitive charging and discharging in accordance with a changeover control signal; and a pulse generating circuit for generating the pulse signal in response to the changeover control signal.

14. The duty ratio setting circuit according to claim 11, wherein the maximum duty ratio corresponds to a maximum ON duty ratio.

15. The duty ratio setting circuit according to claim 14, wherein the maximum ON duty ratio is about 0.9.

16. The duty ratio setting circuit according to claim 11, wherein the logic circuit is an AND circuit.

17. A DC-DC converter comprising:

a switching element duty controlled to convert an input voltage to an output voltage;

an output voltage detection circuit for detecting the output voltage and generating a detection voltage; and a control circuit for duty controlling the switching element based on the detection voltage, wherein the control circuit includes, a triangular waveform oscillation circuit for generating a triangular waveform signal;

an error amplifying circuit for comparing the detection voltage and a reference voltage to generate a control voltage based on the difference therebetween;

a comparator connected to the triangular waveform oscillation circuit and the error amplifying circuit to compare the voltage of the triangular waveform signal with the control voltage and generate a first rectangular waveform signal having a first duty ratio;

a pulse signal generating circuit for generating a pulse signal having a predetermined pulse width and synchronized with triangular waveform signal; and a logic circuit connected to the comparator and the pulse signal generating circuit to receive the first rectangular waveform signal and the pulse signal and generate a second rectangular waveform signal having a predetermined maximum duty ratio based on the pulse width of the pulse signal when the first duty ratio of the first rectangular waveform signal exceeds the predetermined maximum duty ratio.

* * * * *

UNITED STATES PATENT AND TRADEMARK OFFICE
CERTIFICATE OF CORRECTION

PATENT NO. : 6,198,264 B1
DATED : March 6, 2001
INVENTOR(S) : Yashihiro Nagaya et al.

It is certified that error appears in the above-identified patent and that said Letters Patent is hereby corrected as shown below:

<u>Title page,</u>
Item [73], reads "Assignee: Fijitsu Limited, Kawasaki (JP)" should read
-- Assignee: Fujitsu Limited, Kawasaki, (JP) --

Signed and Sealed this

Twentieth Day of May, 2003

JAMES E. ROGAN
*Director of the United States Patent and Trademark Office*